US010006815B2

(12) United States Patent
Hedayat

(10) Patent No.: US 10,006,815 B2
(45) Date of Patent: Jun. 26, 2018

(54) THERMOCOUPLE WITH LOCAL COLD JUNCTION MEASUREMENT

(71) Applicant: Stoneridge Control Devices, Inc., Canton, MA (US)

(72) Inventor: Kayvan Hedayat, Weston, MA (US)

(73) Assignee: STONERIDGE CONTROL DEVICES, INC., Canton, MA (US)

( * ) Notice: Subject to any disclaimer, the term of this patent is extended or adjusted under 35 U.S.C. 154(b) by 669 days.

(21) Appl. No.: 14/464,102

(22) Filed: Aug. 20, 2014

(65) Prior Publication Data
US 2015/0131701 A1 May 14, 2015

Related U.S. Application Data

(60) Provisional application No. 61/868,232, filed on Aug. 21, 2013.

(51) Int. Cl.
G01K 7/12 (2006.01)

(52) U.S. Cl.
CPC ........... *G01K 7/12* (2013.01); *Y10T 29/49169* (2015.01)

(58) Field of Classification Search
CPC .................... G01K 7/12; G01K 7/023
See application file for complete search history.

(56) References Cited

U.S. PATENT DOCUMENTS

| 2,639,305 | A | | 5/1953 | Wills | |
|---|---|---|---|---|---|
| 4,110,124 | A | | 8/1978 | Robertson et al. | |
| 4,122,720 | A | * | 10/1978 | Podl | G01K 3/005 340/449 |
| 4,508,416 | A | * | 4/1985 | Oftedahl | H01R 9/2408 439/650 |
| 5,033,866 | A | * | 7/1991 | Kehl | G01K 17/00 136/225 |
| 5,088,835 | A | * | 2/1992 | Shigezawa | G01K 7/023 136/230 |
| 6,020,551 | A | | 2/2000 | Hall, Jr. | |
| 6,863,438 | B2 | * | 3/2005 | Pannek | G01K 7/028 136/224 |

(Continued)

FOREIGN PATENT DOCUMENTS

| DE | 3446117 | 6/1986 |
|---|---|---|
| DE | 102006034979 | 2/2008 |

(Continued)

OTHER PUBLICATIONS

European Search Opinion dated Jun. 19, 2017 in corresponding EP Patent Application No. EP14838229.*

(Continued)

*Primary Examiner* — Clayton E Laballe
*Assistant Examiner* — Leon W Rhodes, Jr.
(74) *Attorney, Agent, or Firm* — Grossman, Tucker, Perreault & Pfleger, PLLC

(57) ABSTRACT

A thermocouple including first and second thermoelements arranged to define a hot junction and a cold junction. A thermometer is coupled to at least one of the first and second thermoelements to measure the temperature of said cold junction independent of electronics used for conditioning a signal of said thermocouple. The thermoelements may be thick film elements coupled to a substrate. The thermometer may also be coupled to the substrate.

16 Claims, 7 Drawing Sheets

(56) References Cited

U.S. PATENT DOCUMENTS

| | | | | |
|---|---|---|---|---|
| 7,044,638 B2* | 5/2006 | Phillips | ............... | G01K 7/04 |
| | | | | 374/180 |
| 7,753,584 B2* | 7/2010 | Gambino | ............ | G01K 7/04 |
| | | | | 136/225 |
| 2006/0227849 A1 | 10/2006 | Phillips | | |
| 2012/0065923 A1 | 3/2012 | Whiteley | | |

FOREIGN PATENT DOCUMENTS

| | | | | |
|---|---|---|---|---|
| DE | 102009060893 | | 7/2011 | |
| EP | 1014059 | | 10/2005 | |
| GB | 1288864 A | * | 9/1972 | ............ G01K 1/024 |

OTHER PUBLICATIONS

International Search Report and Written Opinion dated Jan. 29, 2015 in corresponding PCT Patent Application Serial No. PCT/US14/051805.

Supplementary Partial European Search Report dated Mar. 13, 2017 in corresponding EP Patent Application No. EP14838229.

* cited by examiner

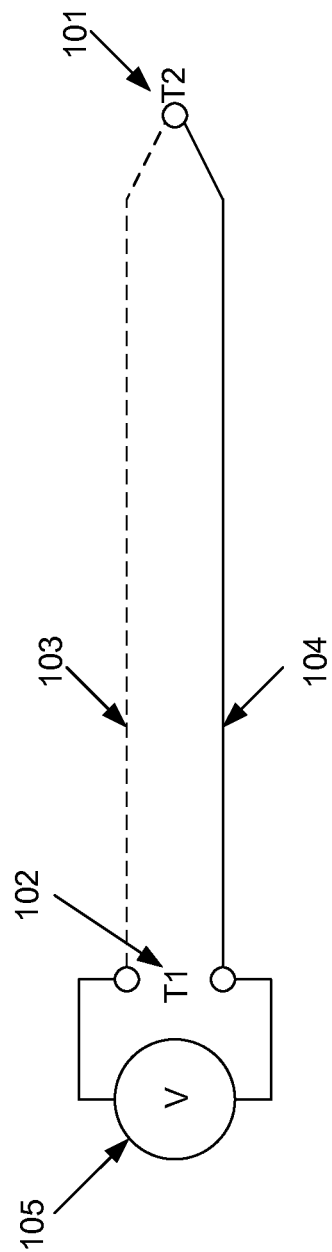

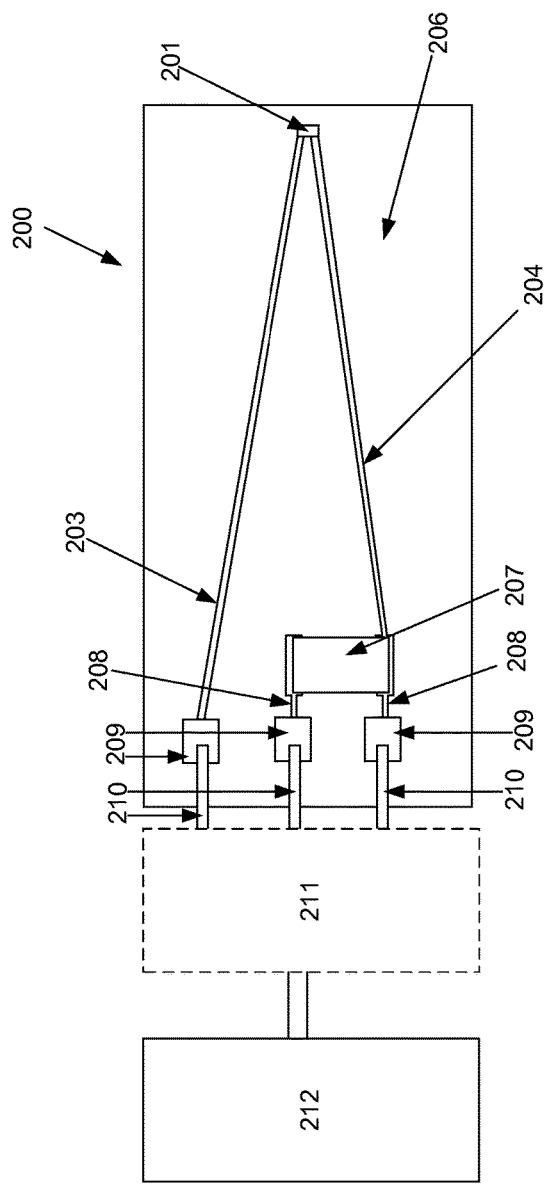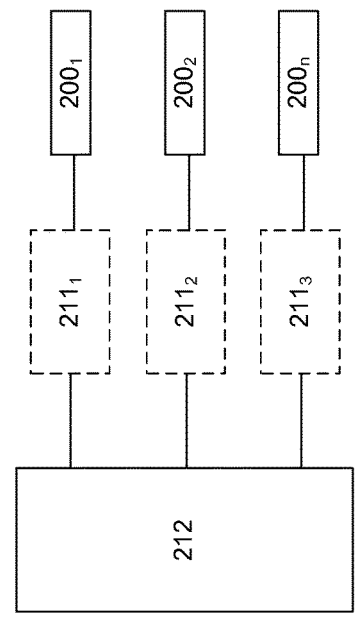
FIG. 2A
FIG. 2B

THERMOCOUPLE WITH LOCAL COLD JUNCTION MEASUREMENT

CROSS REFERENCE TO RELATED APPLICATIONS

The present application claims the benefit of U.S. Provisional Application Ser. No. 61/868,232, filed Aug. 21, 2013, the entire teachings of which are hereby incorporated herein by reference.

FIELD

The present disclosure relates generally to thermocouples, and more particularly to a thermocouple with a local cold junction measurement and thermocouple materials.

BACKGROUND

Generally, a thermocouple is a device made from at least two different wires (thermoelements) that are joined at one end, hereinafter called the "hot" or "measuring" end. The other end of the thermocouple is referred to herein as the "cold" or "reference" end. To measure the temperature $T_2$ of an environment, the measuring end may be exposed to the environment while the reference end is maintained at a temperature $T_1$ (e.g., room temperature), wherein $T_1$ is different than $T_2$. Due to the difference in $T_1$ and $T_2$, a voltage difference can be measured between the two thermoelements using a voltmeter or other instrumentation. In this way, a thermocouple acts as a temperature-voltage transducer. This concept is shown in FIG. 1, which depicts a prior art thermocouple measurement system, in which voltmeter 105 is used to measure the voltage difference between first and second thermoelements 103, 104 when measurement end 101 is exposed to an environment having temperature $T_2$ while reference end 102 is maintained at temperature $T_1$.

The measured voltage can then be mathematically related to temperature at the measuring end using equation 1 below:

$$Emf = \int_{T_1}^{T_2} S_{12} \cdot dT$$
$$= \int_{T_1}^{T_2} (S_1 - S_2) \cdot dT$$

where EMF is the electro-motive force (voltage) produced by the thermocouple at the reference end, $T_1$ and $T_2$ are the temperatures as the reference and measuring ends, respectively, $S_{12}$ is the Seebeck coefficient of the thermocouple, and $S_1$ and $S_2$ are the Seebeck coefficients of first thermoelement 103 and second thermoelement 104, respectively. A cold junction compensator ("CJC") (not shown in FIG. 1) may also be employed to account for error that may be introduced due to differences in the composition of the voltmeter electrodes and thermoelements 103, 104. As may be appreciated, voltmeter 105 and a CJC may be incorporated into a thermocouple controller (also not shown), which may include other components such as a processor and memory.

Thermocouple performance may be enhanced when each of thermoelements 103, 104 is formed from a single wire that extends from measurement end 101 to reference end 102. For cost and other reasons, extension wires may be used to extend the length of thermoelements 103, 104. Such extension wires may facilitate connection of the thermoelements to a thermocouple controller, as described above. However variation in the composition of the extension wires and thermoelements 103, 104 may introduce unwanted voltages and temperature gradients, leading to erroneous temperature measurements. The cost of the extension wires may also be greater than the cost of copper wires. It may therefore be impractical and costly to produce thermocouples with integrated connectors, e.g., for automotive or other applications. This may limit the use of thermocouples in several applications, including automotive applications.

A type N thermocouple is a popular thermocouple type in the automotive industry. Although it offers reasonable accuracy, it cannot match the performance of type R and type S thermocouples, which include precious metal thermoelements. Since the thermoelements and extension wires of these prior art thermocouples must be made from the same alloy, cost often prohibits the use of precious metal type thermocouples in certain applications, such as automotive applications.

The need to use extension wires that are the same material as the thermoelements of a thermocouple may also limit the use of previous metal thermocouples in automotive applications. By way of example, an engine control unit (ECU) may include components that render it suitable for use as a thermocouple controller. However, such use may be precluded because the ECU connectors may be unsuitable for use with the extension wires and/or thermoelements of existing thermocouples. Moreover, in automotive applications it may be desirable to connect several thermocouples together to a single thermocouple controller. If one of the thermocouples connected to the controller fails, it may be necessary to replace the entire component (i.e., the control unit and all thermocouples connected thereto), thus increasing the cost of warranty service.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

FIG. 1 is a schematic top down view of a prior art thermocouple;

FIG. 2A is a schematic top down view of an exemplary thermocouple consistent with the present disclosure.

FIG. 2B depicts an exemplary thermocouple array consistent with the present disclosure.

DETAILED DESCRIPTION

Figure 3:
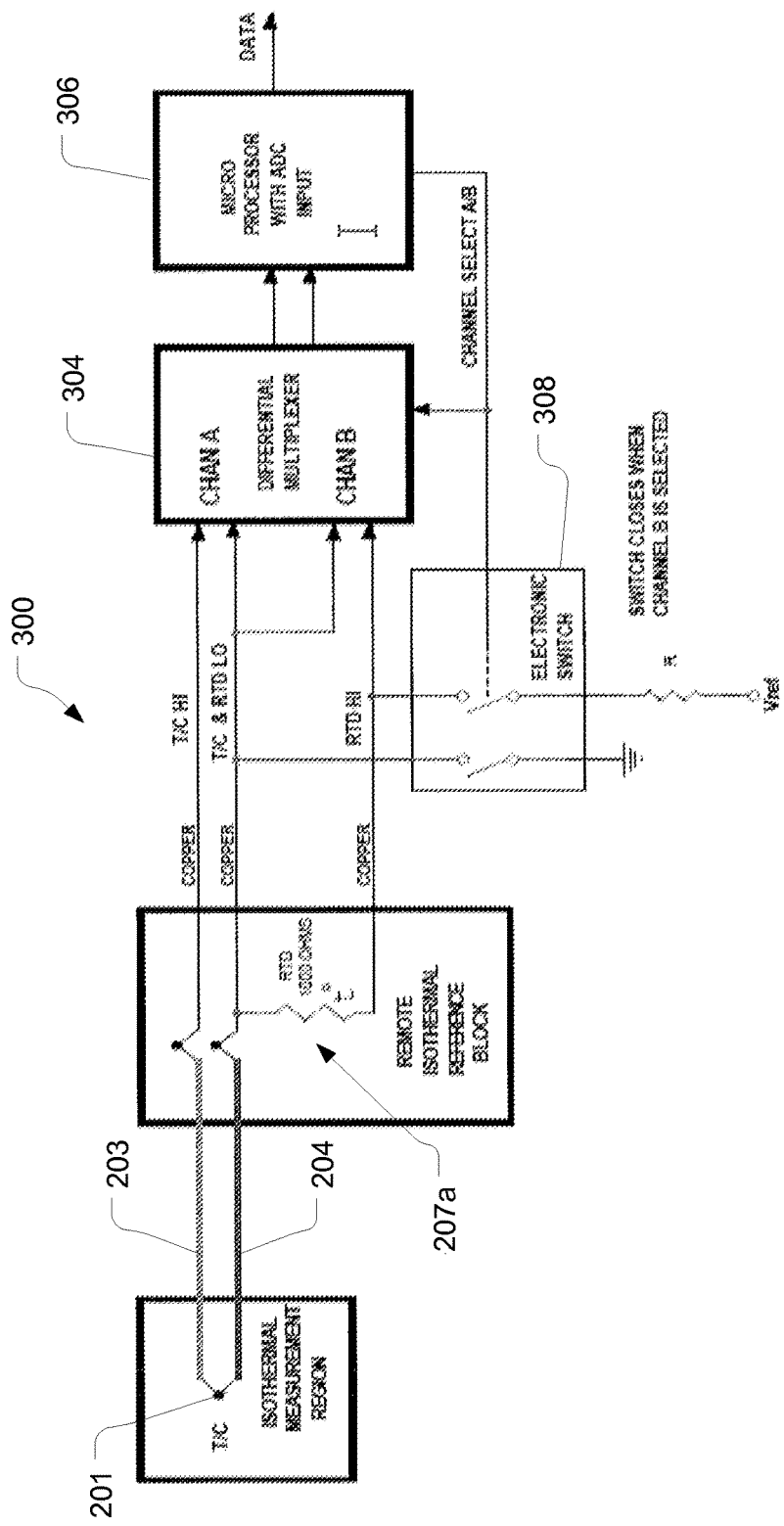
FIG. 3. is circuit diagram of an exemplary thermocouple controller consistent with the present disclosure.

The present disclosure generally relates to thermocouples and thermocouple systems that include components for locally sensing cold junction temperature. Such thermocouples may be constructed to be in the form of a modular part that may be coupled to a variety of connectors, such as connectors that may be used in an automobile (e.g., automobile ECU). The thermocouples described herein may therefore in some embodiments be serviced independent of other thermocouples that may be connected to a common thermocouple controller, and potentially without having to service or replace the controller itself.

The thermocouples described herein may also include thermoelements in the form of one or more relatively thick or thin metal/alloy films that exhibit a predictable and repeatable voltage response to temperature. These films may be deposited on a temperature resistant substrate, e.g., in configurations that may enhance performance, provide redundancy, and/or exhibit other desirable features.

FIG. 2A is a schematic top down view of thermocouple 200 consistent with an embodiment of the present disclosure. Thermocouple 200 includes measurement end 201. Positive and negative thermoelements 203, 204 respectively extend from measurement end 201 to a cold/reference end (not labeled). Positive thermoelement 203 connects measurement end 201 to one of bond pads 209 and negative thermoelement 204 couples measurement end 201 with thermometer 207. Thermometer 207 is coupled to two other bond pads 209 via wire traces 208. All of these components may be deposited and/or mounted on substrate 206. Bond pads 209 may serve as mounting/connection locations for extension wires 210. In the illustrated embodiment, three extension wires 210 connect bond pads 209 with optional connector 211, which itself is connected to thermocouple controller 212. Alternatively, optional connector 211 may be omitted in which case extension wires 210 may connect bond pads 209 to thermocouple controller 212 directly. Thermometer 207 may be wire bonded to appropriate connectors on substrate 206. Alternatively where thermometer 207 is in the form of a flip chip package, it may be mounted to substrate 206 without the use of wire bonds.

Substrate 206 may be manufactured from any material that is suitable for use in thermocouple applications. Without limitation, substrate 206 is preferably selected from materials that tolerate a wide range of temperatures, and in particular high temperature. For example, substrate 206 may be formed from materials that can withstand temperatures ranging from about −300° C. to about 1800° C. As examples of such materials, non-limiting mention is made of ceramics such as alumina, steatite (soapstone), borides and carbides such as $TiB_2$, $ZrB_2$, $NbB_2$, $HfB_2$, $TaB_2$, TiC, ZrC, NbC, HfC, TaC, $B_4C$, silica, silicates, combinations thereof, and the like. Other materials which may be suitable for use as substrate 206 include magnesium oxide (MgO). Without limitation, substrate 206 is preferably formed from alumina or steatite.

Thermoelements 203, 204 may be formed from any suitable thermocouple material, such as but not limited to copper, iron, nickel copper alloys such as constantan (an $Ni_{45}Cu_{55}$ alloy), nickel chromium alloys such as chromel (a $Ni_{90}Cr_{10}$ alloy), nickel manganese aluminum silicon alloys such as alumel (a $Ni_{95}Mn_2Al_2Si_1$ alloy), nickel chromium silicon alloys such as nicrosil (a $Ni_{84.1}Cr_{14.4}$, $Si_{1.4}Mg_{0.1}$ alloy) and $Ni_{84.6}CR_{14}Si_{1.4}$, nickel silicon alloys such as nisil (a $Ni_{95.6}Si_{4.4}$ alloy), platinum and platinum alloys such as $Pt_{70}Rh_{30}$, $Pt_{90}Rh_{10}$, $Pt_{87}Rh_{13}$ and $Pt_{94}Rh_6$, wherein the subscripts denote the weight percentage of the indicated element in the alloy. Without limitation, thermoelement 203 is preferably formed from a first material such as platinum, and thermoelement 204 is preferably formed from a second material, e.g., a PtRh alloy such as $Pt_{90}Rh_{10}$.

In some embodiments, thermoelements 203, 204 may be printed or otherwise deposited on substrate 206 in a desired pattern. As shown in the embodiment of FIG. 2A for example, thermoelements 203 and 204 may be deposited on substrate 206 so as extend from bond pads 209 and/or thermometer 207. In some embodiments, the distance between thermoelements 203 and 204 may gradually decrease until such elements terminate at measurement end 201, at which point they overlap or are otherwise connected to one another to form measurement end 201.

Thermoelements 203, 204 may be formed using any suitable methodology, including vapor deposition, thin film deposition, thick film deposition, photolithography, etching, powder metallurgy, electroless deposition, electrolytic deposition, combinations thereof, and the like. Without limitation, each thermoelement is preferably formed by depositing a paste containing particles of thermoelement material in a binder onto substrate 206 to form one or more thick films. The deposited paste may then be subject to thermal processing to partially or completely remove (e.g., by pyrolysis) the binder, leaving the thermoelement material on substrate 206. In some embodiments, heat treatment of the paste is performed at a temperature sufficient to fuse individual particles of thermoelement powder to one another and to substrate 206.

By way of example, thermoelements 203, 204 may be formed by depositing a paste containing particles of thermocouple material (e.g., platinum for thermoelement 203, platinum rhodium for thermoelement 204) in a binder, so as to form corresponding lines of paste on substrate 206. Subsequent to such deposition, substrate 206 and the deposited paste may be heat treated at a temperature that exceeds the melting point of the thermocouple materials in the paste. The heat treatment may cause the particles of thermoelement material to melt and fuse to one another and to substrate 206, thereby forming thermoelements 203, 204. Alternatively or additionally, thermoelement particles in a deposited paste may be sinter bonded to form thermoelements 203 and 204.

The thickness of thermoelements 203, 204 may vary widely, and may depend on the ultimate application of thermocouple 200. In some embodiments the thickness of thermoelements may range from about 1 to about 1000 microns, although thicker or thinner thermoelements may also be used.

Prior to or before processing of a deposited thermoelement material, other components of thermocouple 200 may be formed and/or adhered to substrate 206, depending on their temperature resistance. For example bond pads 209 and traces 208 may be formed on substrate 206 before or after the formation of thermoelements 203, 204, depending on whether they may withstand the temperature applied to melt and/or sinter the particles of thermocouple material together. In some embodiments, bond pads and traces 209, 208 may be manufactured from conductive material such as copper, aluminum, gold, and the like, which may be deposited (e.g., electrolessly, electrolytically or by some other process such as a thick/thin film process) on substrate 206 and subsequently processed into a desired pattern (e.g., using lithography, etching, or another suitable process). Such materials may have a relatively low melting point as compared to the materials used to form thermoelements 203, 204, and thus may not be able to withstand the temperatures applied to form thermoelements 203, 204. In such instances, it may be preferred to form bond pads 209 and traces 208 after the formation of thermoelements 203, 204. Preferably, thermoelements 203, 204, bond pads 209 and traces 208 are deposited on substrate 206 as one or more thick films, and all of such elements are heat treated at the same time as generally discussed above.

In some embodiments, thermocouples consistent with the present disclosure may be formed by depositing one or more thermoelement and/or conductive materials on a substrate using a thermocouple deposition system. In general, the thermocouple deposition system may include one or more material stores, each of which may store one or more thermoelement and/or conductive materials (e.g., in powder form) for deposition. The system may further include one or more binder stores for storing a binder for the thermoelement and/or conductive materials to be deposited. Additionally, the system may include a control module for controlling the mixing of the binder(s) with the thermoelement/conductive materials, and the deposition of the resulting paste(s) on a substrate.

Paste(s) produced by mixing a thermoelement/conductive material and a binder may be directed to a computer controlled deposition head, which may include one or a plurality of deposition orifices. A control module may cause the deposition head to move in two or three dimensions over a substrate. The control module may further cause one or more pastes to flow through the deposition orifice (e.g., through the actuation of one or more pumps) such that a paste is deposited in a desired pattern on the substrate. This process may repeat as necessary to produce a thermocouple precursor consistent, for example, with a thermocouple design uploaded to the control system. The thermocouple precursor may then be subject to heat treatment (e.g., in a furnace) to pyrolize the binder material and fuse the thermocouple/conductive particles to one another, resulting in the formation of thermoelement and conductive traces on the substrate.

As mentioned previously, thermoelement 204 may extend from measurement end 201 to thermometer 207. In general thermometer 207 may function to measure the temperature at the cold/reference end (not labeled) of thermocouple 200. In this regard, any suitable thermometer may be used as thermometer 207, including but not limited to a resistance temperature detector or a negative temperature coefficient (NTC) thermistor. Generally, thermometer 207 is positioned a sufficient distance away from hot end 201 so that a temperature gradient may be achieved between hot end 201 and the cold junction of thermoelement 200.

As shown in FIG. 2A, thermometer 207 is positioned proximate the end of thermoelement 204, and between extension wires 210 and thermoelements 203, 204. As discussed below, extension wires connect thermoelements 203, 204 to downstream electronics such as thermocouple controller 212. Thermometer 207 may therefore measure the cold junction temperature at a position that is local (i.e., proximate) to cold junction end of thermoelements 203, 204, but which may be quite far from thermocouple controller 212 or other electronics. In other words, thermometer may measure the temperature of the cold junction of thermocouple 200 independently of thermocouple controller 212 or other electronics.

Thermoelements 203, 204 may thus be relatively short. This is unlike traditional thermocouples, which may include very long thermoelements that extend to corresponding electronics, wherein a thermometer may be used to take cold junction measurements proximate to such electronics. (i.e., at a location quite far from the thermocouple hot end). In the embodiment of FIG. 2A, because the cold junction measurement is made locally, extension wires 210 may be made of any material, including relatively low cost materials such as copper.

In some embodiments, the local measurement of cold junction temperature can eliminate the need to use very long thermoelement wires or thermoelement extension wires that are made of the same material as a corresponding thermoelement. Lower cost extension wires can be therefore be used, which may allow designers to use connectors or even have a thermocouple controller that is part of another controller in a vehicle, such as an automobile ECU.

For the sake of clarity, the components of thermocouple 200 extending from measurement end 201 to bond pads 209 are referred to collective herein as a "thermocouple unit." With this in mind, extension wires 210 may be used to connect a thermocouple unit to other elements, such as optional connector 211 and/or thermocouple controller 212. This concept is shown in FIG. 2A, wherein extension wires 210 couple each of bond pads 210 to optional connector 211. Optional connector maybe an output connector for coupling to one or more thermoelements. In such instances, the output connector may be configured to couple with an input connector of a thermocouple controller, which may be an independent controller or form part of another system. For example the output connector may couple to an input connector of an automobile component, such as an engine control unit. In such instances, the automobile component may perform the functions of the thermocouple controllers described herein.

Extension wires 210 may be formed from any suitable material, and without limitation are preferably formed from copper. Of course, other materials may be used to form extension wires 210, such as but not limited to the same materials used to form thermoelements 203 and 204.

Optional connector 2011 may be in any suitable form. For example, optional connector 211 may be in a form that is compatible with a corresponding connector on other instrumentation/components, such as thermocouple controller 212. For example, where thermocouple controller is in the form of an engine control unit of an automobile, optional connector 211 may be a male/female connector that is compatible with a corresponding male/female connector of the engine control unit. In this way, optional connector 211 may facilitate the connection and disconnection of a thermocouple unit from instrumentation such as thermocouple controller 212.

Thermocouple controller 212 may be any suitable controller, and may generally function to measure the voltage drop between measurement end 201 and the reference (cold) end of thermocouple 200. In this regard, thermocouple controller may include processing and memory resources, as well as a voltmeter. Controller 212 may convert voltage(s) measured from thermocouple 200 to temperature, e.g., using the Seebeck coefficients of thermoelements 203, 204 and thermocouple 200.

FIG. 2B is a system level diagram of a thermocouple array consistent with the present disclosure. As shown, the system includes a plurality of thermocouples $200_1$, $200_2$, $200_n$, which may each be in the form of a thermocouple unit as described above in connection with FIG. 2A. Each of thermocouples $200_1$, $200_2$, $200_n$ may be connected (e.g., via extension wires 210 to corresponding connectors $211_1$, $211_2$, $211_3$, which may subsequently connect to thermocouple control 212. In the event that one or more of thermocouples $200_1$, $200_2$, $200_n$ becomes faulty or requires service, its connector may be disconnected from thermocouple controller 212 without requiring the disconnection or replacement of other thermocouples in the array. Moreover, thermocouple controller 212 may be replaced and/or serviced without the replacement of thermocouples $200_1$, $200_2$ and $200_n$. Likewise, controller 212 may be serviced or replaced without the need to replace and/or service thermocouples $200_1$, $200_2$, and/or $200_n$. In summary, the thermocouple technology described herein may allow multiple thermocouples to share the same electronics (e.g., controller), while allowing the controller and each thermocouple to be independently serviced and/or replaced.

FIG. 3 is a circuit diagram of an exemplary thermocouple controller 300 consistent with the present disclosure. In general, the circuit of FIG. 3 is configured to measure the thermocouple voltage and the local cold junction temperature and differentially multiplex the two to share the same return line. In the illustrated embodiment, the controller 300 includes a thermometer 207a configured as a known resistance temperature detector (RTD) 302 for measuring the cold junction temperature, a differential multiplexer 304 with channels A and B, a processor 306 and a switch 308. Channel A of the differential multiplexer 304 is coupled to the first 203 and second 204 thermoelements for measuring the voltage between the thermoelements (between T/C high and T/C low) and channel B is coupled across the RTD. The switch 308 is configured to couple the RTD between a voltage reference $V_{ref}$ and ground when the switch 308 is in a closed state. The switch 308 is configured to open or close in response to channel select output from the processor 306 and the differential multiplexer 304 is configured to select channel A or B for output to the processor 306.

Figure 4:
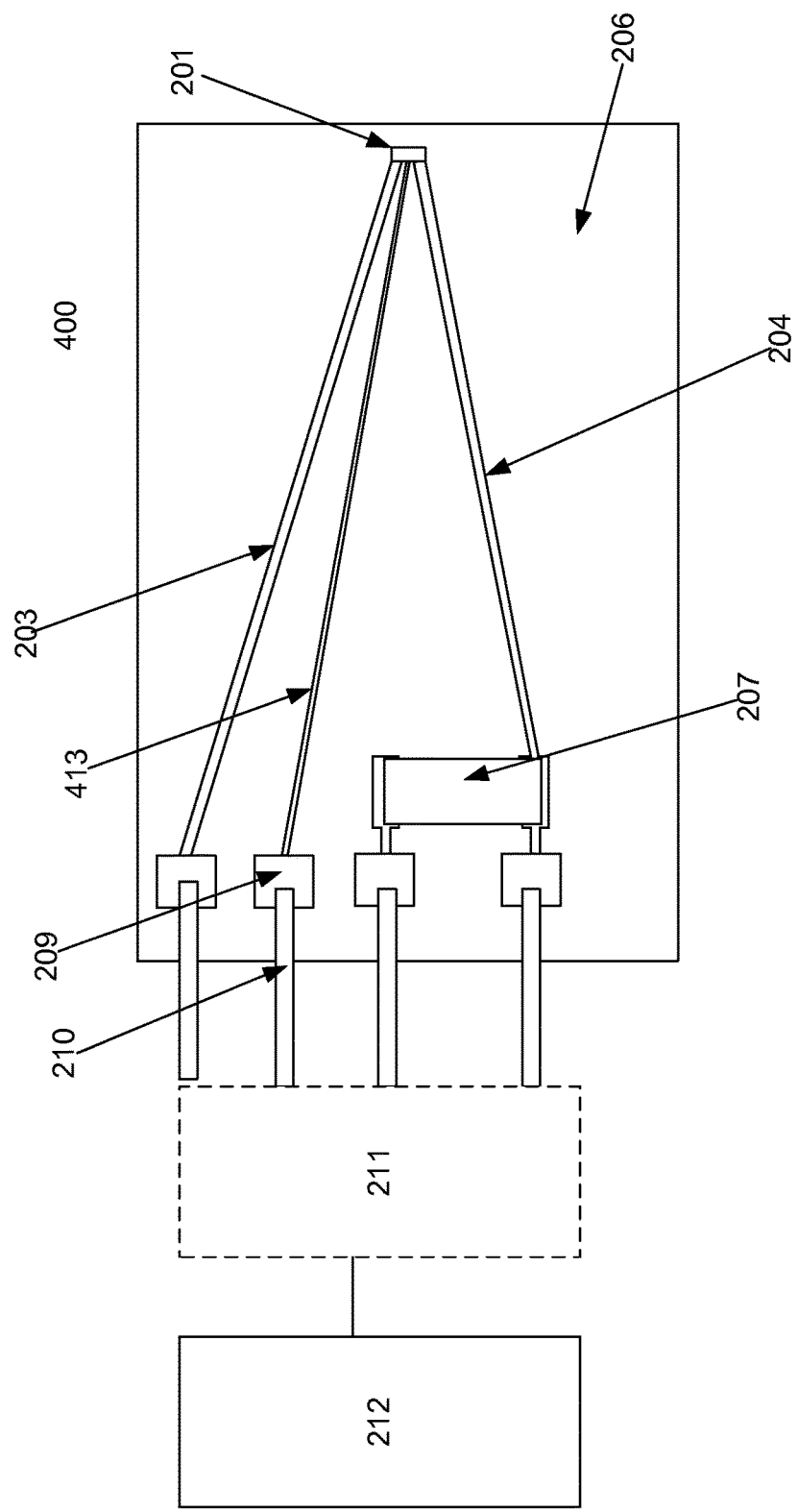
FIG. 4 is a schematic top down view of another exemplary thermocouple consistent with the present disclosure.

FIG. 4 depicts a top down view of an exemplary four wire thermocouple 400 consistent with the present disclosure. The nature and function of many of the components of this thermocouple are the same as those in FIGS. 2A and 2B, and for the sake of brevity are not described again. As shown, thermocouple 400 includes an additional thermoelement 413 which extends from measurement end 201 to an additional bond pad 209. This may allow for the measurement of the cold/reference end temperature of thermocouple 400 without the need for thermometer 207, thus allowing the function of thermometer 207 to be tested. Likewise, this may allow for self diagnostics to be performed on thermocouple 400, e.g., by comparing measurements taken using thermoelements 203 and 204 and thermoelements 413 and 204. Self diagnostics may also be performed, for example, using the methodologies generally described in U.S. Pat. No. 6,020,551, which is incorporated herein by reference.

While FIG. 4 depicts a thermocouple including three thermoelements, it should be understood that any suitable number of thermoelements may be used. Indeed, because the thermoelements described herein may be deposited on substrate 206, e.g., using thick/thin film deposition techniques, a plurality of thermoelements may be used in thermocouple 400. For example, thermocouple 400 may include 2, 3, 4, 5, 10 15, 20, 50 or even 100 thermoelements or more.

Figure 5:
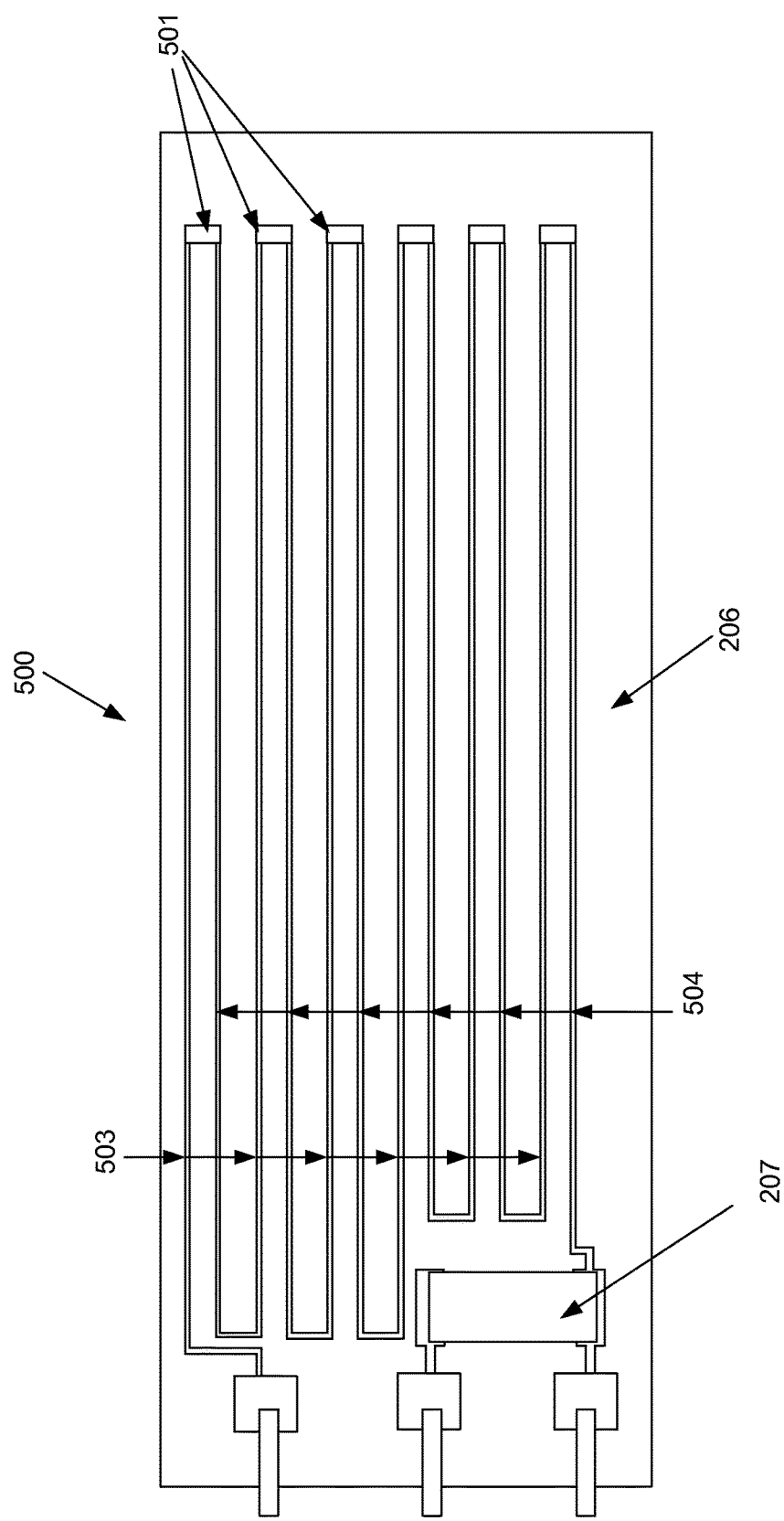
FIG. 5 is a schematic top down view of an exemplary thermocouple consistent with the present disclosure.

FIG. 5 is a top down schematic view of another thermocouple consistent with the present disclosure. As shown, thermocouple 500 includes a plurality of measurement ends 501. Each measurement end 501 is connected to a positive thermoelement 503 and negative thermoelement 504. Each of these thermoelements may be formed from a thermocouple material such as those specified above for thermoelements 203, 204 in FIG. 2A. Without limitation, thermoelements 503, 504 are preferably formed from platinum and a platinum-rhodium alloy, respectively. Each thermoelement may be formed by depositing a thick film of a slurry on substrate 206 in a desired pattern (such as the one shown in FIG. 5), wherein the slurry contains thermoelement material particles in a binder. The deposited thick film(s) may then be processed (e.g., heat treated) to bind the thermoelement material particles to one another and to substrate 206. Such processing may be performed in the same manner as described above in connection with the formation of thermoelements 203, 204 in FIG. 2A, and thus is not described again. As may be appreciated, the use of multiple measurement ends 501 may enhance the voltage signal produced by thermoelement 500 in response to temperature exposure. This may result in enhanced accuracy, signal to noise ratio, and/or other benefits.

Figure 6:
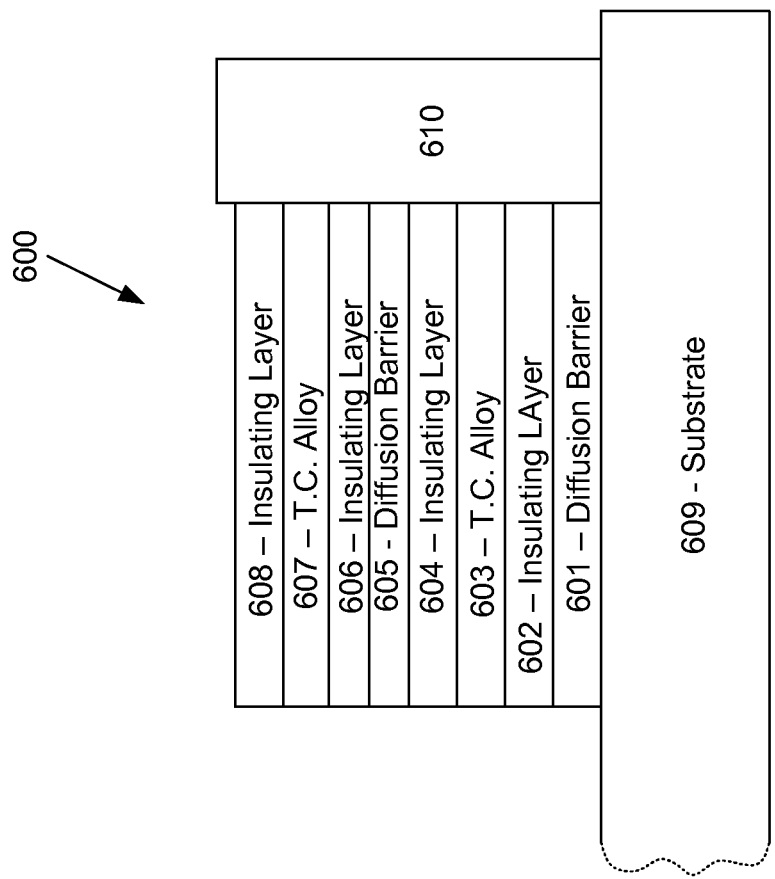
FIG. 6 is a schematic cross-sectional view of a layered thermocouple consistent with the present disclosure.

The capabilities of thin and/or thick film thermoelement deposition may also be leveraged to provide thermocouples with redundant thermoelements. This concept is shown in FIG. 6, which depicts a cross sectional view of another thermocouple consistent with the present disclosure. As shown, thermocouple 600 includes substrate 609 and a measurement end 610. A diffusion barrier 601 is present on substrate 609 and extends from measurement end 610. An insulating layer 602 is deposited on diffusion barrier layer 601, and a thermoelement material 603 is deposited on the insulating layer 602. At this point, the stack of diffusion barrier 601, insulating layer 602 and thermoelement material 603 may form a functional thermoelement of thermocouple 600.

For the sake of illustration and to demonstrate redundancy however, FIG. 6 depicts an embodiment where an additional thermoelement layer is deposited above thermoelement material 603. Specifically, FIG. 6 depicts an embodiment wherein insulating layer 604, diffusion barrier 605, insulating layer 606, thermoelement material 607, and insulating material 608 are successively deposited on thermoelement material 603. Layers of thermoelement material 603, 607 may each be connected to a corresponding thermocouple controller. In the event that one of the layers of thermoelement material 603, 607 becomes corrupt or ceases to function, the controller may switch inputs from the corrupted thermoelement layer to the other. Alternatively, the controller may monitor voltage signals from both layers of thermoelement material 603, 607 and cross-check them against one another to verify the function of such layers.

Diffusion barrier layers 601, 605 generally function to prevent the diffusion of elements between substrate 609, T.C. alloy layer 603 and T.C. alloy layer 607. In this regard, any suitable material may be used as diffusion barrier layers 601, 605, provided that such material can prevent diffusion of the components of the T.C. alloy layers between each other and substrate 609.

For the sake of clarity and ease of explanation, other elements of thermocouple 600 (e.g., a cold/reference end, thermometer, etc.) are not shown, but it should be understood that such elements may be included in thermocouple 600.

Figure 7:
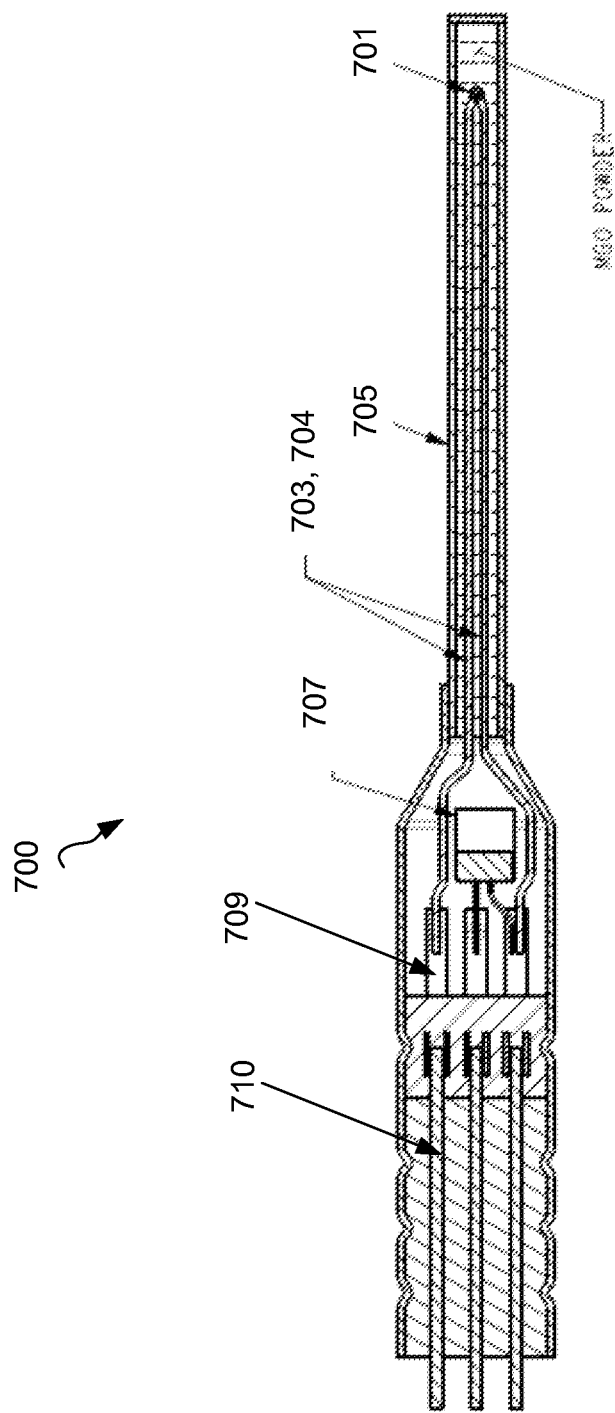
FIG. 7 is a schematic top down view of another exemplary thermocouple consistent with the present disclosure.

While the foregoing description has focused on the use of local cold junction measurement in connection with thermocouples that include one or more thermoelements that are deposited on a substrate, the use of local cold junction measurement is not limited to that context. Indeed, the benefits of local cold junction measurement may be obtained even when it is used in the context of more traditional thermocouple construction. This concept is illustrated in FIG. 7, which depicts a top down schematic view of another thermocouple consistent with the present disclosure.

As shown, thermocouple 700 includes thermoelements 703, 704 which are constructed to define a hot (measurement) end 701, a cold junction end (not labeled). Thermoelements 703, 704 may be in the form of one or more wires or other extrudates of thermoelement material, such as those described above in connection with thermoelements 203 and 204. Rather than being deposited on a substrate as discussed above, thermoelements 703 and 704 may be embedded in a ceramic material such as magnesium oxide (MGO) or another suitable material, and optionally encased within sheath 705. As shown, thermocouple 700 may further include thermometer 707, which may couple to one of thermoelements 703 and 704. In general, thermometer 707 functions to locally measure the cold junction temperature of thermocouple 700, e.g., independently of a thermocouple controller and other electronics. As this functionality is the same as previously described in conjunction with thermometer 207, it is not reiterated for the sake of brevity.

Thermocouple 700 may further include bond pads 709 and extension wires 710, the function of which is the same as bond pads 209 and extension wires 210 of FIGS. 2A and 2B. More specifically, bond pads 209 may provide connection points for thermoelements 703, 204 and/or thermometer 707. A first end of extension wires 210 may couple to bond pads 709, and a second end of extension wires 1210 may couple to a connector and/or thermocouple controller, as described previously.

According to one aspect of the disclosure there is thus provided a thermocouple, including first and second thermoelements arranged to define a hot junction and a cold junction of the thermocouple; and a thermometer coupled at least one of the first and second thermoelements to measure the temperature of the cold junction independent of electronics used for conditioning a signal of the thermocouple.

According to another aspect of the disclosure there is provided a thermocouple including: first and second thermoelements arranged to define a hot junction and a cold junction of the thermocouple; a thermometer including an input coupled to the second thermoelement, the thermometer configured to measure the temperature of the cold junction; a first extension wire coupled to the first thermoelement; and a second extension wire coupled to an output of the thermometer.

According to another aspect of the disclosure there is provided a thermocouple, including: a plurality of thick film thermoelements arranged to provide a plurality of hot junctions and a single cold junction; and a thermometer coupled at least one of the first and second thermoelements to measure the temperature of the cold junction independent of electronics used for conditioning a signal of the thermocouple.

According to another aspect of the disclosure there is provided a thermocouple system, including: a first thermocouple including first and second thermoelements arranged to define; a first hot junction and a first cold junction of the first thermocouple, the first thermocouple further including a first thermometer coupled to the second thermoelement to measure a temperature of the first cold junction; a second thermocouple including third and fourth thermoelements arranged to define a second hot junction and a second cold junction of the second thermocouple, the second thermocouple further including a second thermometer coupled to the fourth thermoelement to measure a temperature of the second cold junction; and a thermocouple controller coupled to the first and second thermocouples; wherein the first and second thermometers respectively measure a temperature of the first and second cold junctions independent of the thermocouple controller.

According to another aspect of the disclosure there is provided a method of producing a thermocouple, including depositing a first thick film of a first paste on a substrate, the first paste including particles of a first thermocouple material in a first binder; depositing a second thick film of a second paste on a substrate, the second past including particles of a second thermocouple material in a second binder; and heating the first and second thick films to drive off the first and second binders and form respective first and second thermoelements arranged to form a hot junction and a cold junction of the thermocouple.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuitry" may comprise, for example, singly or in any combination, hardwired circuitry, programmable circuitry, state machine circuitry, and/or firmware that stores instructions executed by programmable circuitry. An "integrated circuit" may a digital, analog or mixed-signal semiconductor device and/or microelectronic device, such as, for example, but not limited to, a semiconductor integrated circuit chip.

Although the terms "first," "second," "third" etc. may be used to describe various elements, components, regions, layers and/or sections, these elements, components, regions, layers and/or sections are not to be limited by these terms as they are used only to distinguish one element, component, region, layer or section from another element, component, region, layer or section. Thus, a first element, component, region, layer or section could be termed a second element, component, region, layer or section without departing from the scope and teachings of the present invention.

Spatially relative terms, such as "beneath," below," upper," "lower," "above" and the like may be used herein for ease of description to describe one element or feature's relationship to another element(s) or feature(s) as illustrated in the drawings. These spatially relative terms are intended to encompass different orientations of the device in use or operation in addition to the orientation shown in the drawings. For example, if the device in the drawings is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A thermocouple, comprising:
a substrate;
first and second thermoelements disposed on the substrate;
a hot junction disposed on the substrate between the first and second thermoelements;
a cold junction disposed on the substrate;
a thermometer disposed on the substrate and coupled to at least one of the first and second thermoelements to measure the temperature of the cold junction independent of electronics used for conditioning a signal of the thermocouple;
a first extension wire coupled to and extending from the first thermoelement and away from the substrate; and
a second and a third extension wire each coupled to and extending from the thermometer and away from the substrate;
wherein the first, the second, and the third extension wires each comprise the same material.

2. The thermocouple of claim 1, wherein the first and second thermoelements are deposited on the substrate.

3. The thermocouple of claim 2, wherein the first and second thermoelements are thick film elements.

4. The thermocouple of claim 1, wherein the first, the second, and the third extension wire are coupled to at least one output connector, the at least one output connector forming a male/female connector compatible with a corresponding male/female input connector of an automobile component.

5. The thermocouple of claim 4, wherein the automobile component comprises a thermocouple controller.

6. The thermocouple of claim 4, wherein the automobile component comprises an engine control unit.

7. The thermocouple of claim 1, wherein at least one of the first, the second, or the third extension wires comprise are copper.

8. The thermocouple of claim 1, further comprising a third thermoelement arranged with the first and second thermoelements to define a second hot junction.

9. The thermocouple of claim 1, wherein the first and second extension wires differ in composition from the first and second thermoelements, respectively.

10. The thermocouple of claim 1, further comprising a thermocouple controller coupled to the first, the second, and the third extension wires.

11. The thermocouple system of claim 1, further comprising:
at least third and fourth thermoelements disposed on the substrate between the first and the second thermoelements; and
at least a second hot junction disposed on the substrate.

12. The thermocouple system of claim 1, wherein the first and the second thermoelements define the first hot junction disposed on the substrate.

13. A thermocouple system, comprising:
a first thermocouple unit comprising;
a first substrate;
first and second thermoelements arranged on the first substrate;
a first hot junction disposed on the first substrate between the first and second thermoelements;
a first cold junction disposed on the first substrate;
a first thermometer disposed on the first substrate and coupled to the second thermoelement to measure a temperature of the first cold junction;
a first extension wire coupled to and extending from the first thermoelement and away from the first substrate; and
a second and a third extension wire each coupled to and extending from the first thermometer and away from the first substrate;
wherein the first, the second, and the third extension wires each comprise the same material;
a second thermocouple unit comprising:
a second substrate;
third and fourth thermoelements arranged on the second substrate;
a second hot junction disposed on the second substrate between the third and fourth thermoelements;
a second cold junction disposed on the second substrate;
a second thermometer disposed on the second substrate and coupled to the fourth thermoelement to measure a temperature of the second cold junction;
a fourth extension wire coupled to and extending from the second thermoelement and away from the second substrate; and
a fifth and a sixth extension wire each coupled to and extending from the second thermometer and away from the second substrate;
wherein the fourth, the fifth, and the sixth extension wires each comprise the same material;

a thermocouple controller coupled to the first and second thermocouples units; and a first and a second output connector coupled to the first and second thermocouple units, respectively, the first and second output connectors each forming a male/female connector compatible with corresponding male/female input connectors of the thermocouple controller;

wherein the first and second thermometers respectively measure a temperature of the first and second cold junctions independent of the thermocouple controller.

14. The thermocouple system of claim 13, wherein the first thermocouple unit may be replaced by disconnecting the first male/female output connector of the first thermocouple unit from the corresponding male/female input connectors of the thermocouple controller without replacing the second thermocouple unit and the thermocouple controller.

15. The thermocouple system of claim 14, wherein the second thermocouple unit may be replaced by disconnecting the second male/female output connector of the second thermocouple unit from the corresponding male/female input connectors of the thermocouple controller without replacing the first thermocouple unit and the thermocouple controller.

16. The thermocouple system of claim 15, wherein the controller may be replaced by disconnecting the male/female input connectors of the thermocouple controller from the first and second male/female output connectors of the first and second thermocouple units without replacing the first thermocouple unit and the second thermocouple unit.

* * * * *